Aug. 26, 1969  D. ENGELSMANN ET AL  3,463,066
EXPOSURE REGULATING DEVICE FOR PHOTOGRAPHIC CAMERA
Filed Dec. 1, 1966  2 Sheets-Sheet 2

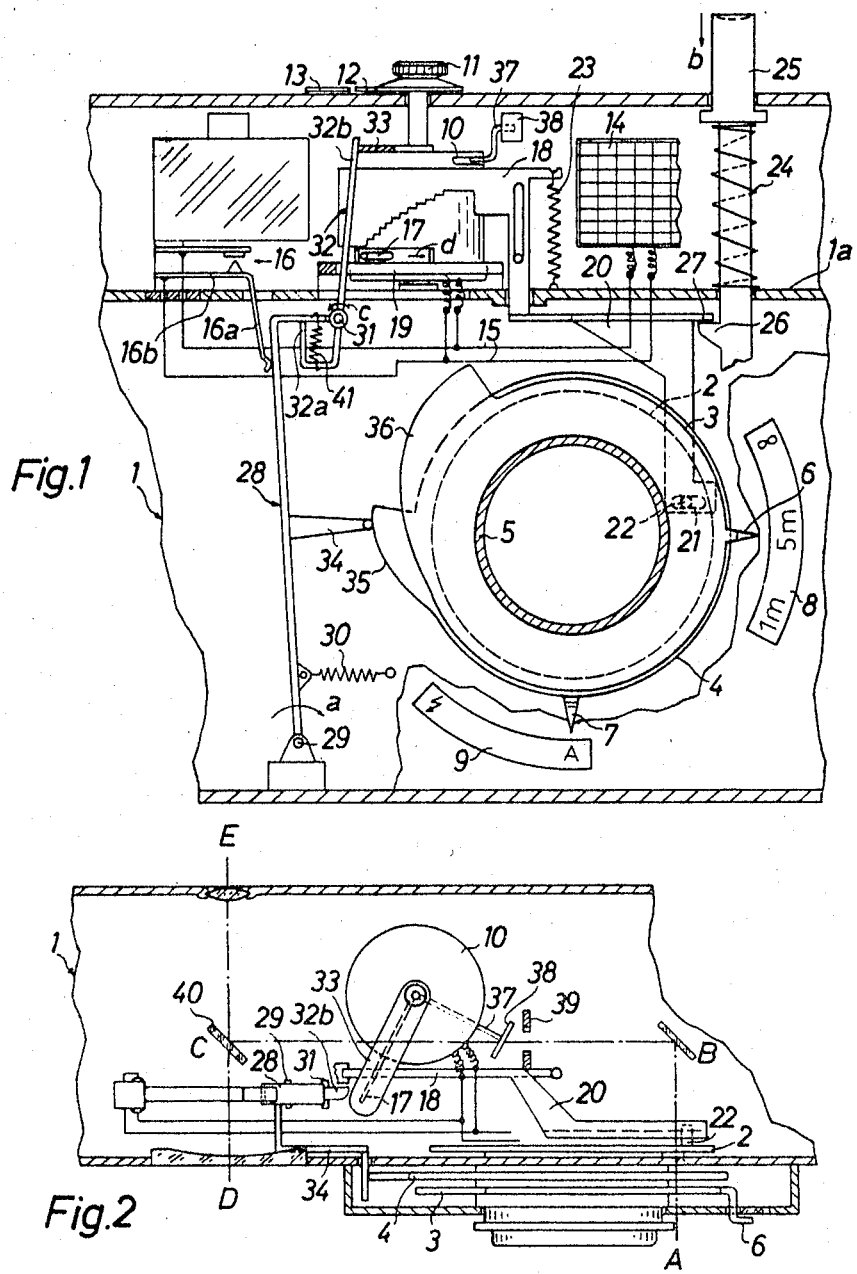

INVENTOR.
DIETER ENGELSMANN
HUBERT HACKENBERG
BY
Michael S. Striker
ATTORNEY

3,463,066
EXPOSURE REGULATING DEVICE FOR PHOTOGRAPHIC CAMERA

Dieter Engelsmann, Unterhaching, and Hubert Hackenberg, Munich-Solln, Germany, assignors to Agfa-Gevaert Aktiengesellschaft, Leverkusen, Germany
Filed Dec. 1, 1966, Ser. No. 598,393
Claims priority, application Germany, Dec. 2, 1965, A 50,954
Int. Cl. G01j 1/52
U.S. Cl. 95—10       19 Claims

---

ABSTRACT OF THE DISCLOSURE

A photographic camera comprising an exposure control device including an adjustable diaphragm, exposure meter, focusing means, electric circuit and an output member. The diaphragm is adjusted as a function of the position of the output member. When the camera is set for operation in daylight, the position of the output member is a function of scene brightness and such position is determined by the electric circuit which includes a photosensitive receiver. When the camera is set for operation with flash, the circuit is ineffective and the position of the output member is determined by an integrator mechanism which is adjustable by the focusing means and as a function of film speed.

---

The present invention relates to photographic cameras, and more particularly to improvements in exposure regulating devices for photographic cameras. Still more particularly, the invention relates to improvements in semi-automatic or automatic exposure regulating devices which can be adapted to daylight or flash operation.

It is already known to provide a photographic camera with an exposure regulating device which includes an electric exposure meter and a scanning system adapted to select the aperture as a function of the position of a needle forming part of a moving coil instrument in the exposure meter so that, when making exposures in daylight, the size of the diaphragm aperture is a function of the intensity of scene light. The moving coil instrument is adjustable to account for the sensitivity of film in the camera, and the exposure time is selected in advance. When the user wishes to make an exposure with flash, the photoresponsive element of the exposure meter is disconnected from the moving coil instrument and a special motion transmitting system is provided to set the moving coil instrument in a predetermined position to account for film sensitivity and for the selected exposure time.

A serious drawback of such cameras is that their exposure regulating devices are too complicated and too bulky, particularly because they must embody the aforementioned motion transmitting system for adjusting the moving coil instrument prior to making an exposure with flash. In addition, the user must adjust the exposure regulating device to account for the guide number of the flash unit and the sensitivity of film before the camera can make a satisfactory exposure with flash.

Accordingly, it is an important object of the present invention to provide a photographic camera, particularly a still camera, with a greatly simplified exposure regulating device whose adjustment for making exposures in daylight or with flash requires less knowledge and less time than the adjustment of exposure regulating devices in the above outlined conventional cameras.

Another object of the invention is to provide an exposure regulating device which can be properly set for flash operation without even knowing the guide number for the particular type of film that is being employed in making exposures with flash.

A further object of the invention is to provide an exposure regulating device wherein all of the exposure values can be selected manually or wherein at least the size of the diaphragm aperture can be selected automatically as a function of the intensity of scene light.

A concomitant object of the invention is to provide an exposure regulating device which comprises a selector capable of setting the camera for operation in daylight or with flash and wherein such selector simultaneously performs another important function.

Still another object of the invention is to provide the exposure regulating device with a novel warning or signalling system which can indicate the satisfactory range of light intensities for operation in daylight and/or with flash.

A further object of the invention is to provide an exposure regulating device wherein the sensitivity of film, the guide number of the flash unit, and the distance from the subject may be fully accounted for in making an exposure with flash.

An ancillary object of the invention is to provide a photographic camera which embodies the above outlined exposure regulating device.

Another object of our invention is to provide an exposure regulating device wherein all such setting and selecting members which must be manipulated prior to making an exposure in daylight or with flash are closely adjacent to each other and wherein the exposure meter is utilized not only for operation in daylight but also when operating with flash.

An additional object of the invention is to provide an exposure regulating device which can be utilized with different types of flash units.

Briefly stated, one feature of the present invention resides in the provision of a photographic camera which comprises a novel exposure regulating device including an adjustable diaphragm having a range of apertures, exposure meter means including photoresponsive means, adjustable support means, and an output member adjustable with such support means and positionable by the photoresponsive means with reference to the support means at various distances from a starting position as a function of the intensity of scene light, diaphragm setting means adapted to select the aperture in dependency on the position of the output member (either automatically or in response to manipulation by hand), focus adjusting means, integrator means for positioning the output member independently of the intensity of scene light as a function of the selected adjustment of the focus adjusting means and as a function of the adjustment of the support means to thereby enable selection of the aperture for operation with flash, and selector means movable between at least one first position to set the camera for operation in daylight by disengaging the integrator means from the output member and a second position to set the camera for operation with flash by disconnecting the photoresponsive means from the output member so that the position of the output member is then influenced by the integrator means.

The support means for the output member may be adjusted to account for the sensitivity of film which is being used in the camera. The selector means may perform an additional function, for example, selecting the exposure time for daylight operation.

The novel features which are considered as characteristic of the invention are set forth in particular in the appended claims. The improved exposure regulating device itself, however, both as to its construction and its mode of operation, together with additional features and advantages thereof, will be best understood upon perusal of the following detailed description of certain specific embodiments with reference to the accompanying drawings, in which:

FIG. 1 is a front elevational view of a first exposure regulating device with automatic selection of the diaphragm aperture, the device being built into a still camera whose housing and certain other components are shown in vertical section;

FIG. 2 is a fragmentary top plan view of the exposure regulating device with the housing of the camera shown in horizontal section;

Figure 3:
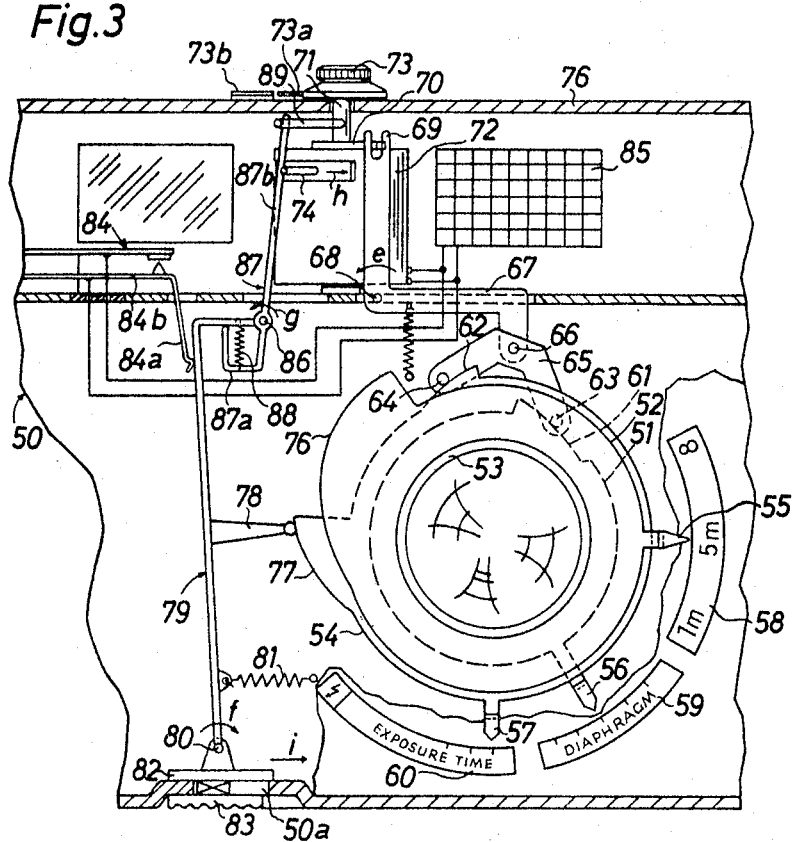
FIG. 3 is a front elevational view of a second exposure regulating device with manual selection of the diaphragm aperture.

Referring first to FIGS. 1 and 2, there is shown a still camera having a housing 1 carrying a tubular lens mount 5 which supports a turnable diaphragm aperture setting ring 2, a turnable focusing or focus adjusting ring 3, and a turnable selector ring 4. Each of the rings 2, 3 and 4 can rotate independently of the other two rings and the rings 3, 4 are respectively provided with suitably bent manually actuatable lugs 6, 7 which are movable into registry with selected graduations or symbols on two fixed scales 8 and 9. The scale 8 is a distance scale and its graduations are indicative of various distances from the subject. The lug 6 simultaneously performs the function of an index because its position with reference to the scale 8 indicates the selected distance. The lug 7 also constitutes an index and can be placed into registry with one of two symbols on the scale 9. The symbol A indicates that the selector ring 4 has adjusted the camera for automatic selection of the size of diaphragm aperture in daylight and the thunderbolt symbol indicates that the camera is adjusted for operation with flash.

The exposure regulating device of the camera further comprises an exposure meter including a moving coil instrument 10 whose housing or support means is adjustable by means of a knob 11. The knob 11 has an index 12 which cooperates with a scale 13 having graduations indicative of different film sensitivities. The knob 11 can be omitted if the camera is provided with a motion transmitting system which is capable of automatically changing the angular position of the support means of the moving coil instrument 10 in response to insertion of a supply cartridge into the corresponding chamber of the housing 1. It is well known that many supply cartridges are provided with markers which can change the position of a suitable tracking or sensing element mounted in the camera and connected with the moving coil instrument to adjust the latter as a function of the sensitivity of film in the freshly inserted cartridge.

The moving coil instrument 10 is connected in an electric circuit 15 including a photoresponsive element 14 (a resistor or a cell) which can change the position of the output member or needle 17 of the instrument 10 as a function of the intensity of scene light. The circuit 15 further comprises a short-circuiting switch 16 which normally tends to assume a closed position but is held in open position (shown in FIG. 1) when the selector ring 4 adjusts the camera for automatic selection of the diaphragm aperture in daylight. In the open position of the switch 16, the photoresponsive element 14 can select the angular position of the needle 17 as a function of the intensity of scene light. When the switch 16 closes, the needle is disconnected from the element 14 and automatically assumes a starting position. On opening of the switch 16, the needle can move away from starting position by a distance which is a function of the intensity of scene light.

The needle 17 is turnable at a level below a stepped tracking or scanning member 18 and can be pressed by the latter against a fixed back support here shown as a rail 19. The tracking or scanning member 18 is movable up and down and is biased downwardly (toward the needle 17) by a relatively weak helical contraction spring 23. This tracking member is rigid or integral with a motion transmitting arm 20 having an elongated slot 21 for a pin 22 of the ring 2. This ring is coupled with the diaphragm blades (not shown) in such a way that the size of the aperture defined by the blades varies in response to angular displacement of the ring 2 and as a function of linear displacement of the arm 20 which, in turn, is a function of the intensity of scene light. The action of the relatively weak spring 23 is opposed by a stronger spring 24 which operates between an internal partition 1a of the housing 1 and a shutter release trigger 25 which is depressible by hand. The inner end portion of the trigger 25 has a hooked projection 26 which engages a platform 27 of the arm 20 and maintains the latter in the upper end position shown in FIG. 1 when the trigger 25 is released. Thus, the spring 24 normally maintains the diaphragm aperture setting ring 2 in an end position.

In order to be properly adjustable for operation with flash, the camera further comprises an integrator which includes a linkage having a one-armed lever 28 mounted at one end on a pivot pin 29 and biased in a clockwise direction (as viewed in FIG. 1) by a helical spring 30. The free end of the lever 28 carries a pivot 31 for a two-armed lever 32 one arm 32a of which normally bears against the lever 28 under the action of a helical spring 41. The other arm 32b of the lever 32 can be moved into abutment a stop 33 fixed to the moving coil instrument 10 and/or to the shaft of the knob 11. The arm 32b is also movable into engagement with and can displace the needle 17. The movable contact 16b of the short-circuiting switch 16 has an extension 16a which is engaged by the lever 28 when the selector ring 4 has adjusted the camera for automatic operation in daylight. When the index 7 is moved into registry with the symbol indicating operation with flash, the lever 28 allows the movable contact 16b to engage the fixed contact of the switch 16 whereby the latter closes and prevents the photoresponsive element 14 from influencing the position of the needle 17 as a function of the intensity of scene light. The needle 17 then automatically assumes a predetermined starting position which is shown in FIGS. 1 and 2.

The lever 28 of the integrator linkage further comprises an arm 34 which constitutes a follower and can track one of two cams 35, 36 respectively provided on the rings 4 and 3. When the camera is set for automatic operation in daylight, the follower 34 tracks the cam 35 of the selector ring 4. When the latter is turned in a clockwise direction to place the index 7 into registry with the thunderbolt symbol of the scale 9, the follower 34 engages with the cam 36 of the focusing or focus adjusting ring 3.

The needle 17 is rigid with a pointer 37 which carries a flag 38 constituting a warning signal and cooperating with a fixed window 39. The flag 38 can be moved into the pathway of an incoming light beam A which is deflected at B and passes through the window 39 toward a mirror 40 which deflects it at C into the rear lens of the viewfinder. The dot-dash lines D—E indicates the path of light rays from the front lens to the rear lens of the viewfinder.

In order to make an exposure in daylight and with automatic determination of the diaphragm aperture, the operator will move the selector ring 4 to the angular position shown in FIG. 1. The trigger 25 is then depressed (arrow b) so that the projection 26 moves downwardly and allows the spring 23 to contract. The stepped tracking or scanning member 18 can move downwardly until it engages the needle 17 and then presses the latter against the rail 19. The arm 20 shares such downward movement of the member 18 and causes the pin 22 to change the angular position of the ring 2 in order to select an optimum size for the diaphragm aperture. Such size is a function of the intensity of scene light because the angular position of the needle 17 is also a function of scene light for reasons well known to persons familiar with automatic exposure meters. The downward stroke of the trigger 25 is of sufficient length to allow for movement of the projection 26 away from the platform 27 after the tracking or scanning member 18 is arrested by the needle 17. At the end of its downward stroke (which is always of the same length), the trigger 25 releases the shutter so that the camera makes an exposure. The shutter speed can be fixed for automatic operation or it may be varied in a manner not shown in FIGS. 1 and 2. The focus adjusting ring 3 has been set prior to depression of the trigger 25 so that the range finder has properly focused the camera upon the subject. For example, the index 6 can be moved to one of three positions including a position for portraits (1 meter), a position for group shots (5 meters) and a position for scenery (infinity).

To make an exposure with flash, the user will change the angular position of the selector ring 4 so that the index 7 registers with the corresponding symbol on the scale 9. The spring 30 then causes the lever 28 to pivot in a clockwise direction (arrow $a$) because the follower 34 travels along the radially inwardly sloping lobe of the cam 35 and ultimately engages the cam 36 of the focus adjusting ring 3. Thus, the angular position of the lever 28 is now dependent on the setting of the focus adjusting ring 3, namely, on the distance between the camera and the subject. As the lever 28 begins to pivot in the direction of arrow $a$, it moves away from the extension 16a of the movable contact 16b so that the short-circuiting switch 16 closes and enables the needle 17 to return to starting position because the photoresponsive element 14 cannot influence its position. The arrangement is preferably such that the radilly outermost point of the cam 36 is nearer to the axis of the lens mount 5 than the radially outermost point of the cam 35, i.e., the deflection of the lever 28 in a counterclockwise direction is greater when the follower 34 engages the tip of the lobe on cam 35.

When the lever 28 pivots in a clockwise direction, the lever 32 begins to pivot in a counterclockwise direction (arrow $c$) as soon as its upper arm 32b engages the stop 33 of the moving coil instrument 10. The arm 32a then moves away from abutment with the lever 28 and the spring 41 stores energy. The angular position of the stop 33 is indicative of the sensitivity of film which must be considered for making an exposure with flash. As the lever 28 continues to pivot in a clockwise direction, the pivot 31 advances further to the right, as viewed in FIG. 1, and the upper arm 32b of the lever 32 engages the needle 17 to move the latter from the starting position shown in FIG. 1 or 2 (arrow $d$). The clockwise movement of the lever 28 is terminated when the follower 34 engages the cam 36 of the focus adjusting ring 3. This also terminates mechanical displacement of needle 17 from its starting position so that the needle assumes an intermediate position which will determine the size of the diaphragm aperture in response to depression of the shutter release trigger 25. The camera is now set by full consideration of film sensitivity (angular position of the stop 33 on the instrument 10), of the distance between the camera and the subject (angular position of the focus adjusting ring 3) and the light output of the flash unit which is utilized during the exposure with flash. The trigger 25 is then depressed to release the platform 27 whereby the tracking or scanning member 18 follows the bias of the spring 23 and moves into abutment with the needle 17 whose position is determined by the cam 36 and stop 33. The arm 20 adjusts the ring 2 and thereby selects an appropriate size of the diaphragm aperture.

If the operator holds the camera at a considerable distance from the subject, the follower 34 engages a portion of the cam 36 which is located at a relatively large distance from the optical axis so that the lever 28 pivots very little from the left-hand end position shown in FIG. 1, i.e., the resulting angular displacement of the lever 32 is insufficient to move the arm 32b into engagement with the needle 17. The needle then remains in its starting position shown in FIG. 2 and the pointer 37 holds the flag 38 in registry with the window 39. By looking through the rear lens of the viewfinder, the operator notes that the flag 38 is in the pathway of the light beam A and is informed that the camera cannot make a satisfactory exposure with flash. The flag 38 preferably also registers with the window 39 when the intensity of incoming scene light prior to making an automatic exposure in daylight is so weak that the camera cannot make a satisfactory exposure. This again warns the operator that he should not depress the trigger 25.

The extent to which the upper arm 32b of the lever 32 can move the needle 17 in the direction indicated by arrow $d$ depends on the setting of the knob 11, i.e., on the sensitivity of film which is being used in the camera. Thus, the flag 38 can indicate the range of light intensities which are satisfactory to make an exposure with flash with films of different sensitivities.

Figure 4:
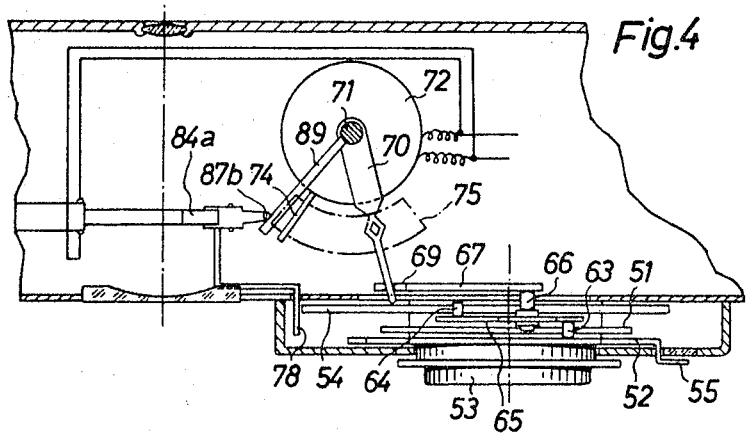
FIG. 4 is a top plan view of the second exposure regulating device.

FIGS. 3 and 4 illustrate a modified still camera which comprises a semiautomatic diaphragm. Furthermore, the integrator linkage of this camera is built in such a way that it can take into consideration the specific guide number of the flash unit which is being used in making exposures with artificial illumination of the subject.

The camera comprises a housing 50 carrying a lens mount 53 which is surrounded by a diaphragm setting ring 51, a focus adjusting ring 52 and an exposure time setting ring 54. The rings 51, 52 and 54 are rotatable about the optical axis independently of each other and are respectively provided with indices or lugs 56, 55 and 57. The indices 55–57 can be manipulated by hand and respectively cooperate with fixed scales 58, 59 and 60. The scale 58 is a distance scale; the scale 59 is calibrated to indicate various sizes of the diaphragm aperture; and the scale 60 is calibrated to indicate various exposure times. The thunderbolt symbol on the exposure time scale 60 registers with the index 57 when the camera is set for operation with flash. The exposure time setting ring 54 can be called a selector because it performs the function of the selector ring 4, i.e., it can move between at least one first position (in which the index 57 registers with one of the graduations on the right-hand portion of the scale 60) to set the camera for operation in daylight and a second position to set the camera for operation with flash. This is of advantage because the ring 54 automatically selects an appropriate exposure time for operation with flash.

The rings 51 and 54 are respectively provided with cams 61 and 62 which are tracked by two followers 63, 64 provided on a bell crank lever 65 pivoted at 66 on a second bell crank lever 67. The lever 67 is pivotable on a horizontal pin 68 fixed to the housing 50. The upper arm of the lever 67 is bifurcated, as at 69, and can change the angular position of a trailing pointer 70 turnable on the shaft 71 of a knob 73 which corresponds to the knob 11 of FIG. 1 and can change the angular position of the housing or support means of a moving coil instrument 72 to account for different film sensitivities. The index 73a of the knob 73 can be placed into registry with different graduations on a fixed sensitivity scale 73b. The shaft 71 is rigid with the knob 73 and with the housing or support means of the instrument 72. The needle 74 of the moving coil instrument 72 can be displaced by a photoresponsive element 85 and is located behind a transparent observation window 75, together with the trailing pointer 70, see FIG. 4. The window 75 is provided in the top panel 76 of the upper housing portion 76.

The focus adjusting ring 52 and the exposure time setting ring or selector 54 are respectively provided with cams 76 and 77 which correspond to cams 36 and 35 of FIG. 1. One of these cams 76, 77 is engaged by the follower 78 of a one-armed lever 79 corresponding to the lever 28 and pivotally connected to a slidable adjuster 82 by a pivot pin 80. The adjuster 82 is slidable in a slot 50a of the housing 50 and is provided with a milled head 83 which is accessible to the fingers of an operator to permit manual shifting of the pivot 80 in order to account for the guide number of the selected flash unit. The underside of the housing 50 may carry a scale adjacent to the head 83 to facilitate the user's work in selecting the proper guide number. The lever 79 is biased by a helical spring 81 which tends to pivot it in a clockwise direction, as viewed in FIG. 3 (see the arrow *f*), so that the follower 78 invariably engages with one of the cams 76, 77.

The upper end of the lever 79 is shown in engagement with the extension 84*a* of a movable contact 84*b* forming part of a short-circuiting switch 84 in the circuit of the photoresponsive element 85. The switch 84 is shown in open position because the camera is not set for operation with flash (see the angular position of the index 57). The upper end portion of the lower 79 carries a pivot 86 for a two-armed lever 87 whose lever arm 87*a* is biased by a spring 88 and bears against the lever 79. The upper arm 87*b* of the lever 87 is movable into abutment with a stop 89 on the shaft 71 of the knob 73, and also with the needle 74. The stop 89 could be rigidly affixed to the housing or support means of the moving coil instrument 72.

For making an exposure in daylight, the operator adjusts the rings 51, 54 to respectively select the size of the diaphragm aperture and the exposure time. The photoresponsive element 85 selects the angular position of the needle 74 as a function of the intensity of scene light, but the needle 74 cannot directly influence any of the exposure values. The operator knows that the exposure values are properly selected if the trailing pointer 70 registers with the needle 74. Thus, the operator can select several combinations of exposure time and diaphragm aperture for any given intensity of scene light, as long as the bell crank levers 65, 67 place the pointer 70 into registry with the needle 74. The angular position of the needle 74 is also a function of the sensitivity of film because the entire housing or support means of the moving coil instrument 72 is adjusted by the knob 73. During adjustment of the rings 51 and 54, the upper arm of the bell crank lever 67 will be rocked in a clockwise direction or in a counterclockwise direction (arrow *e*). Each such angular displacement of the lever 67 causes the bifurcated end portion 69 to change the angular position of the trailing pointer 70 with reference to the axis of the shaft 71.

In order to make an exposure with flash, the user will turn the exposure time selecting ring 54 until the index 57 registers with the appropriate symbol on the scale 60. During such turning of the ring 54, the lever 79 pivots in a clockwise direction (arrow *f* in FIG. 3) because the follower 78 tracks the cam 77. On completed clockwise angular displacement of the ring 54, the follower 78 engages the cam 76 of the focus adjusting rig 52. This enables the movable contact 84*b* to close the switch 84, i.e., the needle 74 assumes a starting position. Before the follower 78 engages the cam 76, the upper arm 87*b* of the lever 87 engages the stop 89 so that the lever 79 begins to pivot in a counterclockwise direction (arrow *g*) and the upper arm 87*b* ultimately reaches and displaces the needle 74 (arrow *h*). The operator can turn the focus adjusting ring 52 and its cam 76 before or after the selector ring 54 is moved to a position corresponding to operation with flash. In the final preparatory step, the operator must turn the ring 51 until the trailing pointer 70 registers with the needle 74. Once the pointer 70 and the needle 74 overlie each other, the camera is set for operation with flash by full consideration of the film sensitivity (position of the stop 89), distance from the subject (index 55) and guide number of the flash unit (adjuster 82). The guide number of the flash unit which is being used to furnish artificial light may be selected by shifting the adjuster 82 in or counter to the direction indicated by arrow *i*. This adjusts the integrator linkage and accounts for the selected guide number. The value of the light output can be given as the guide number of flash units for use with film having a sensitivity of 18, expressed in DIN norms.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, an exposure regulating device comprising an adjustable diaphragm having a range of apertures; exposure meter means including photoresponsive means, adjustable support means, and an output member adjustable with said support means and positionable by said photoresponsive means with reference to said support means at various distances from a starting position as a function of the intensity of scene light; diaphragm setting means adapted to select the aperture in dependency on the position of said output member; focus adjusting means; integrator means for positioning said output member independently of said intensity as a function of said focus adjusting means and the adjustment of said support means to thereby enable selection of said aperture for operation with flash; and selector means movable between at least one first position to set the camera for operation in daylight by disengaging said integrator means from said output member and a second position to set the camera for operation with flash by disconnecting said photoresponsive means from said output member so that the position of said output member is then influenced by said integrator means.

2. An exposure regulating device as defined in claim 1, wherein said exposure meter means comprises a moving coil instrument whose housing and needle are respectively constituted by said support means and said output member, said housing being turnable about a fixed axis.

3. An exposure regulating device as defined in claim 1, further comprising means for adjusting said integrator means as a function of the guide number of the flash unit which is utilized in making exposures with flash.

4. An exposure regulating device as defined in claim 1, wherein said selector means is movable between a plurality of first positions each of which corresponds to a different exposure time.

5. An exposure regulating device as defined in claim 1, further comprising warning means positionable with said output member and arranged to produce a signal when the intensity of scene light or artificial light is outside of a predetermined range of satisfactory intensities.

6. An exposure regulating device as defined in claim 1, wherein said selector means and said focus adjusting means are respectively provided with first and second cam means and said integrator means comprises first rockable lever means having follower means respectively tracking said first and second cam means in the first and second positions of said selector means, and second lever means coupled with said first lever means and adapted to move said output member from starting position when said follower means tracks said second cam means.

7. An exposure regulating device as defined in claim 6, further comprising means for biasing said follower means against said cam means.

8. An exposure regulating device as defined in claim 7, further comprising first pivot means supporting one end of said first lever means and second pivot means coupling said first and second lever means.

9. An exposure regulating device as defined in claim 8, wherein said support means comprises stop means for said second lever means, said second lever means being arranged to rock about said second pivot means upon engagement with said stop means and while said selector means is being moved from the first to the second position thereof and to move said output member from starting position during rocking about said second pivot means in a predetermined range of positions of said second cam means.

10. An exposure control as defined in claim 8, further comprising adjuster means for selecting the position of said first pivot means as a function of the guide number of the flash unit which is utilized with the camera in making exposures with flash.

11. An exposure regulating device as defined in claim 6, wherein said selector means and said focus adjusting means are constituted by concentric rings and wherein said first and second cam means extend radially outwardly from the respective rings.

12. An exposure regulating device as defined in claim 11, wherein the radially outermost point of said second cam means is nearer to the common axis of said rings than the radially outermost point of said first cam means.

13. An exposure regulating device as defined in claim 1, further comprising shutter release means movable from an idle position to an operative position and motion transmitting means including scanning means responsive to movemet of said shutter release means from idle position to automatically adjust said diaphragm setting means as a function of the position of said output member in the first position of said selector means.

14. An exposure regulating device as defined in claim 1, further comprising trailing pointer means operatively connected with said diaphragm setting means and movable into registry with said output member when the size of the aperture manually selected by said diaphragm setting means is a function of the position of said output member.

15. An exposure regulating device as defined in claim 14, wherein said trailing pointer means is movable into registry with said output member when the size of the aperture manually selected by said diaphragm setting means is also a function of the setting of said focus adjusting means.

16. An exposure regulating device as defined in claim 1, wherein the means for disconnecting said photoresponsive means from said output member in response to movement of said selector means to second position comprises an electric switch which is opened by said integrator means in the first position of said selector means.

17. An exposure regulating device as defined in claim 1, wherein said focus adjusting means, said diaphragm setting means and said selector means are constituted by three concentric rings each turnable independently of the other two rings.

18. An exposure regulating device as defined in claim 17, wherein said support means is adjustable to account for sensitivity of film which is being utilized in the camera and said integrator means is adjustable to account for the guide number of the flash unit used with the camera in the second position of said selector means.

19. An exposure regulating device as defined in claim 17, further comprising index means provided on at least two of said rings and fixed scale means adjacent to each of said index means, one of said scale means being calibrated to indicate various distances from the scene and the respective index means being provided on said focus adjusting means.

References Cited
UNITED STATES PATENTS

| | | | |
|---|---|---|---|
| 3,072,028 | 1/1963 | Lange | 95—10 |
| 3,072,033 | 1/1963 | Hahn et al. | 95—10 |
| 3,203,330 | 8/1965 | Kiper | 95—64 |
| 3,283,681 | 11/1966 | Singer et al. | 95—10 |

NORTON ANSHER, Primary Examiner

CHARLES E. SMITH, Assistant Examiner

U.S. Cl. X.R.

95—11, 44, 64